R. B. MAGEE.

Temper Screw for Oil Wells.

No. 9,288. Reissued July 13, 1880.

WITNESSES

Frank A. Griswold.

Chas J. Coughlin

INVENTOR

R. B. Magee

PER Jno. K. Hallock

ATTY

N. PETERS, PHOTO-LITHOGRAPHER, WASHINGTON, D. C.

UNITED STATES PATENT OFFICE.

ROBERT B. MAGEE, OF OIL CITY, PENNSYLVANIA.

TEMPER-SCREW FOR OIL-WELLS.

SPECIFICATION forming part of Reissued Letters Patent No. 9,288, dated July 13, 1880.

Original No. 85,461, dated December 29, 1868. Application for reissue filed June 3, 1880.

*To all whom it may concern:*

Be it known that I, ROBERT B. MAGEE, of Oil City, in the county of Venango and State of Pennsylvania, have invented certain new and useful Improvements in Temper-Screws; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to the construction of the temper-screw apparatus used in drilling oil or other deep wells; and it consists in an improved construction of what is known as the "frame;" and, further, in appliances for adjusting the said frame upon the screw.

Figure 1:
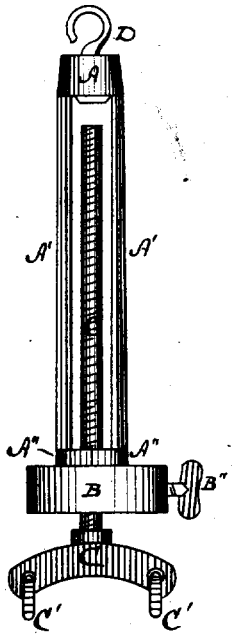
Figure 2:
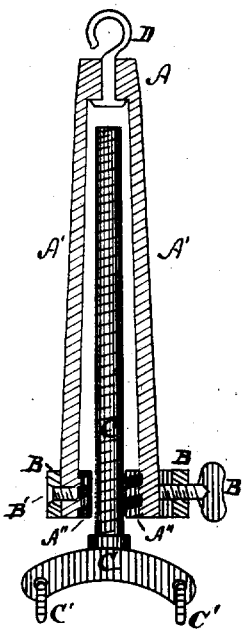

My invention is illutrated in the accompanying drawings as follows: Figure 1 is an elevation of my improved temper-screw apparatus, and shows the nut closed upon the screw. Fig. 2 shows the frame and clamp of said apparatus in vertical section and the screw in elevation, the nut being open.

A A′ A′ A″ A″ is the frame, of which A is the head, A′ A′ are the reins, and A″ A″ the bifurcated nut. This frame is constructed as follows: It is of one piece of metal forged into the form required—that is to say, into the form substantially as shown—having a head, A, two reins, A′ A′, and a nut, A″. In forging, the part forming the nut is made solid and is rounded up for the proper form of the exterior of the nut, and is then drilled through vertically and screw-threaded inside to receive the screw C, and is then bifurcated midway between the reins.

It will be seen that when thus constructed the frame is of one piece of metal, having a head, A, reins A′ A′, and a bifurcated nut, A″ A″, the two lobes of the nut being, respectively, on the ends of the two reins, as shown. The reins should be formed so as to spring the lobes of the nut slightly apart in order to give free passage for the screw between them.

A clamp, B B″, is used to hold the segments of the nut together upon the screw when desired to put the nut in gear with the screw. This clamp consists of a band, B, attached to one of the segments of the nut by a screw or rivet, B′, and forming a loop or hoop with diameter sufficient to allow room for the nut to spring apart. On the opposite side of this loop from the rivet B′ is a set-screw, B″, working in a screw cut in the part B. This completes the clamp, for as the set-screw B″ is screwed up the segments of the nut are brought to adjustment upon the screw C, or as the screw B″ is unscrewed the segments of the nut open and the screw C is free from the nut. The other parts shown in the drawings—viz., the screw C, links C′ C′, and swiveled loop D—are the same as in ordinarily-constructed temper-screw apparatus.

Previous to my invention the frame was constructed usually the same as in the drawings, except that the nut was not bifurcated and the clamp was not used, there being no use for it. In the apparatus thus constructed, when the screw C was screwed down to its full length, and it was necessary to shift it back, it had to be screwed back. By my device the screw is shifted by loosening the clamp and allowing the nut to open, when the screw C can be at once shifted by lifting it up.

I am aware that bifurcated nuts in connection with feed-screws have been used, and therefore I shall not claim, broadly, the use of a bifurcated nut in a temper-screw apparatus. My invention consists wholly in the construction of the frame, substantially as shown and described, and of the combination therewith of the clamp. The frame as constructed constitutes an article of manufacture, for the other parts of the apparatus greatly outlast the frames, which have to be often reconstructed.

In order to keep the other parts of the apparatus in constant use an extra frame should be provided.

What I claim as new is as follows:

1. As an article of manufacture, a frame for a temper-screw apparatus used in boring oil or other deep wells, consisting of a head, reins, and bifurcated nut formed of one piece of metal, substantially as and for the purposes set forth.

2. In a temper-screw apparatus for boring oil or other deep wells, a frame consisting of a head, reins, and bifurcated nut formed of one piece of metal, and a clamp for closing said nut together, substantially as and for the purposes set forth.

3. In a temper-screw apparatus for boring oil or other deep wells, a frame consisting of a head, reins, and bifurcated nut, and a clamp operating to close the said nut, substantially as set forth.

In testimony that I claim the foregoing I have hereunto set my hand this 10th day of April, 1880.

ROBERT B. MAGEE.

Witnesses:

JNO. K. HALLOCK,

GEO. A. STURGEON.